(12) United States Patent
Zydel et al.

(10) Patent No.: US 11,166,070 B1
(45) Date of Patent: Nov. 2, 2021

(54) DISTRIBUTED ANALYSIS OF NETWORK HEALTH

(71) Applicant: CSC Holdings, LLC, Bethpage, NY (US)

(72) Inventors: Chris Zydel, Dix Hills, NY (US); Rajesh Khandelwal, Princeton Junction, NJ (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

(21) Appl. No.: 17/085,865

(22) Filed: Oct. 30, 2020

(51) Int. Cl.
| | |
|---|---|
| *H04N 21/442* | (2011.01) |
| *H04L 12/26* | (2006.01) |
| *H04L 12/24* | (2006.01) |
| *H04N 21/647* | (2011.01) |
| *H04N 21/45* | (2011.01) |
| *H04B 10/07* | (2013.01) |
| *H04H 60/32* | (2008.01) |
| *H04B 1/04* | (2006.01) |

(52) U.S. Cl.
CPC ..... *H04N 21/44209* (2013.01); *H04B 1/0466* (2013.01); *H04B 10/07* (2013.01); *H04H 60/32* (2013.01); *H04L 41/0654* (2013.01); *H04L 41/0677* (2013.01); *H04L 43/0817* (2013.01); *H04N 21/4424* (2013.01); *H04N 21/4524* (2013.01); *H04N 21/64723* (2013.01)

(58) Field of Classification Search
CPC ............. H04N 17/04; H04N 21/44209; H04N 21/64723; H04H 60/29–32; H04B 1/0466; H04B 10/07–0799; H04L 41/0654–0677; H04L 43/0817
See application file for complete search history.

(56) References Cited

U.S. PATENT DOCUMENTS 5,574,495 A * 11/1996 Caporizzo ............... H04H 20/12
348/192
5,953,389 A * 9/1999 Pruett .................. H04L 12/2874
379/9
(Continued)

FOREIGN PATENT DOCUMENTS

CN 104052542 A * 9/2014 ......... H04B 10/0791
CN 111010227 A * 4/2020
(Continued)

*Primary Examiner* — Robert J Hance
(74) *Attorney, Agent, or Firm* — Sterne, Kessler, Goldstein & Fox P.L.L.C.

(57) ABSTRACT

Disclosed herein are system, method, and computer program product embodiments for identifying a geographical location of an issue in a broadcasting network. An embodiment operates by a server or a headend sending a diagnostic test to a set-top box capable of processing a channel. The diagnostic test informs the first set-top box to have an idle tuner tune to the channel and to determine a performance characteristic of the first set-top box in processing the first channel. After receipt of the performance characteristic, the server or headend performs an analysis of the first characteristic and determines whether there is an issue in the broadcasting network. If there is an issue, the server or headend identifies a geographical location of the issue in the broadcasting network and sends the geographical location to a user for resolution of the issue.

23 Claims, 7 Drawing Sheets

(56) References Cited

U.S. PATENT DOCUMENTS

| | | | | |
|---|---|---|---|---|
| 2007/0087696 A1* | 4/2007 | D. Bonta | ............ | H04L 43/0817 |
| | | | | 455/67.11 |
| 2015/0358771 A1* | 12/2015 | Richley | .................. | G01S 5/021 |
| | | | | 455/456.1 |
| 2016/0241334 A1* | 8/2016 | Moran, III | .............. | H04L 43/12 |

FOREIGN PATENT DOCUMENTS

| | | | | |
|---|---|---|---|---|
| EP | 1128606 A2 * | 8/2001 | ........... | H04L 12/437 |
| WO | WO-2007128097 A1 * | 11/2007 | ......... | H04L 41/0631 |

* cited by examiner

DISTRIBUTED ANALYSIS OF NETWORK HEALTH

BACKGROUND

Cable providers typically have large and sophisticated broadcasting networks to provide service to set-top boxes (STBs). However, many cable providers have limited knowledge of the topology of their broadcasting networks. For example, some cable providers do not have specific knowledge of the geographical locations of all components in the broadcast network. As a result, upon receiving complaints of issues with STBs, with limited or no information on the geographical locations and/or causes of the issues, cable providers must deploy service technicians to resolve them.

To assist service technicians, some cable providers purchase costly and complex diagnostic devices. However, the service technicians typically must go to each component in the broadcasting network, connect the diagnostic devices to the component, and determine if the component is the cause of the issue. This can be very timely and burdensome, sometimes causing the broadcasting networks to be down for a significant period of time.

As such, cable providers are unable to proactively analyze their broadcasting networks without significant burden and costs of having service technicians continually out in the field and testing components in the broadcasting network. Along these lines, cable providers are unable to identify the presence or geographical locations of issues in real-time, for example, during users' utilization of the STBs. In other words, cable providers are unable to identify a relative locative of an issue in the broadcasting network, causing an issue to one or more STBs.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
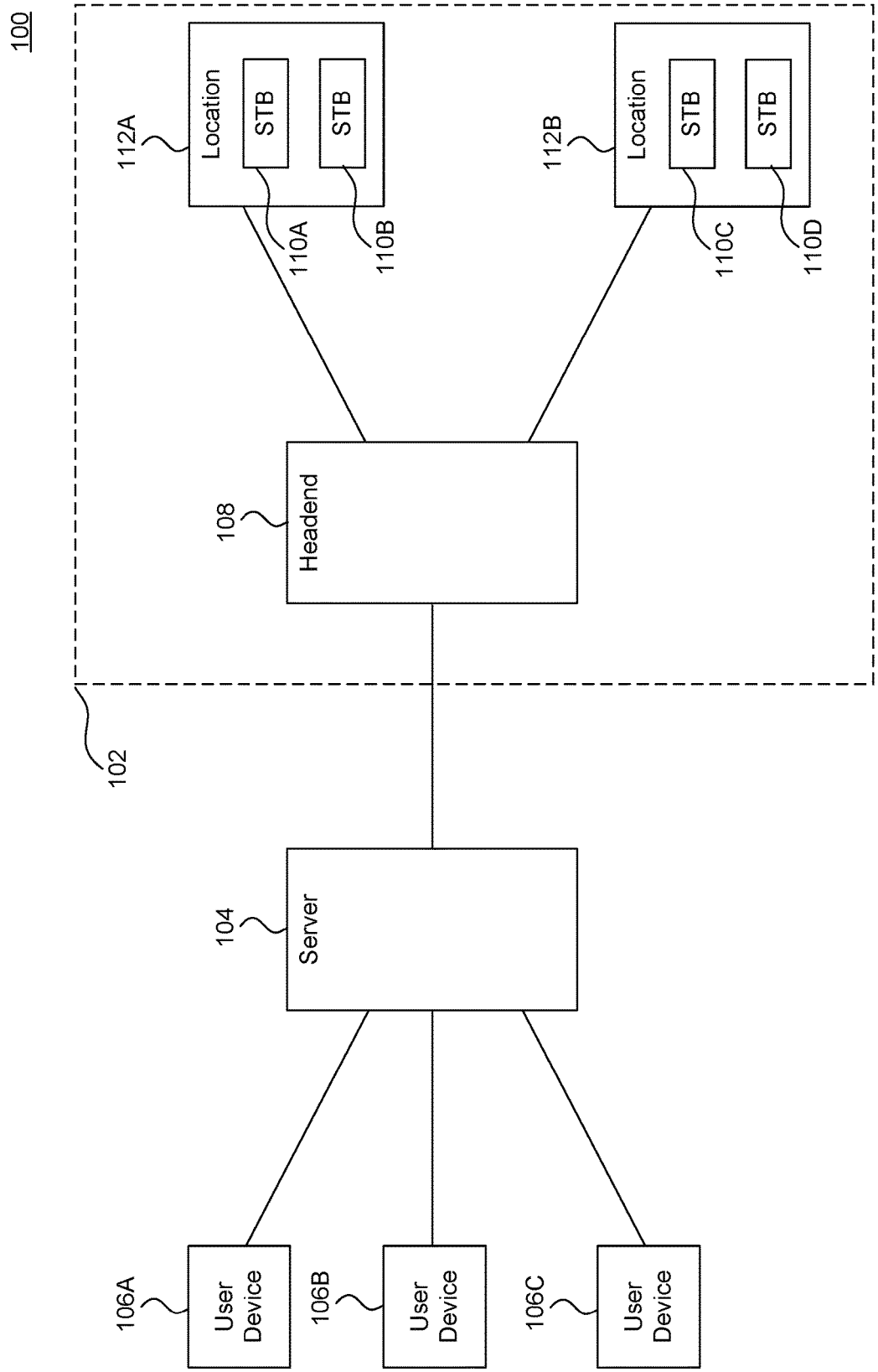
FIG. 1 is a block diagram of an example communication system for notifying users of issues in a broadcasting system, according to some embodiments.

Provided herein are system, apparatus, device, method and/or computer program product embodiments, and/or combinations and sub-combinations thereof, for locating issues relating to set-top boxes (STBs) in a broadcasting network.

To do so, cable providers or third parties send requests to the STBs in a broadcasting network to perform diagnostic tests on specific channels. The requests may be sent in real-time, for example, while the STBs are receiving programming data and/or processing the same or different channels than in the request. Further, the requests may be sent periodically (e.g., daily or hourly) and may be initiated by the cable providers irrespective of the receipt of complaints from STB users. Additionally, the requests may be sent to specific STBs in the broadcasting network, such as an STB of the user providing a complaint, or to all STBs in the broadcasting network.

The requests specify diagnostic tests for determining performance characteristics for specific channels provided by the STBs. As such, the diagnostic tests may include instructions for an idle tuner to tune to a specific channel, while the STBs determine performance characteristics relating to that channel. The performance characteristics may relate to signal quality, signal strength, and/or signal noise ratio, to provide a few examples.

Upon receipt of the STBs' performance characteristics for specified channels, cable providers or third parties perform an analysis to determine if there is an issue in the broadcasting network affecting the particular STB's ability to process the channels. The analysis may be determined if the performance metrics are in line with ranges provided in specifications for the channels. As such, if the performance characteristics are not in line with the specification's ranges, the cable providers or third parties determine that there is an issue in the broadcasting networks. The issue may relate to any component in the broadcasting network, such as a headend, a fiber node, a tap, an amplifier, a STB, a coaxial cable, and/or a fiber cable.

The cable providers or third parties then determine the geographical location of the issue. In some embodiments, the cable providers or third parties are aware of the topology of the broadcasting system. As such, the cable providers or third parties determine the exact geographical location of the source of the issue in the broadcasting system. However, in other embodiments, the cable providers or broadcasting system may only know the geographical location and/or interconnection of some components in the broadcasting system. As such, the cable providers or third parties determine a relative geographical location of the source of the issue in the broadcasting system based on a number of different methodologies, as will be discussed in more detail below.

After identifying the precise geographical location of the source of the issue, the cable providers or third parties are able to send a service technician to fix the issue. Likewise, after identifying the relative geographical location of the source of the issue, the cable providers or third parties are able to direct a service technician to the geographical location of the issue. As such, cable providers or third parties are able to quickly determine a presence and geographical location of an issue in the broadcasting network, as well as permit an appropriate action to be taken in real-time without receiving calls from STB users. This can be done without the need to purchase costly and complex diagnostic devices separate from the components already utilized in the broadcasting networks.

FIG. 1 illustrates a block diagram of an example system 100 for notifying users of issues in a broadcasting network 102. System 100 includes server 104 and/or user devices 106A-C. Although server 104 and headend 108 are illustrated as separate devices, in some embodiments, server 104 and headend 108 may be combined to be a single device. As such, where server 104 is referred to in this disclosure, a person skilled in the art would readily understand that the same applies to the combined device.

As will be discussed in more detail below, broadcasting network 102 includes one or more set-top boxes (STBs) 110A-D. STBs 110A-D may be located at various geographical locations 112A and 112B. Geographical locations 112A and 112B may include any physical structures, such as a place of business or a home to provide some examples, that has one or more STBs 110A-D. Accordingly, in some embodiments, a particular geographical location 112A or 112B may have one STBs from among STBs 110A-D or multiple STBs 110A-D. Although FIG. 1 illustrates the broadcasting network 102 as having the STBs 110A-D located at geographical locations 112A and 112B, this is for exemplary purposes only. Those skilled in the relevant art(s) will recognize that the teachings herein are equally applicable to broadcasting networks having more or less STBs and/or more or less geographical locations without departing from the spirit and scope of the present disclosure.

Server 104, broadcasting network 102, and user devices 106A-C are managed by the same or different entities. For example, in some embodiments, server 104, broadcasting network 102, and user devices 106A-C may be managed by a single entity, such as a cable provider. However, in some embodiments, server 104, broadcasting network 102, and user devices 106A-C may be managed by different entities. For example, broadcasting network 102 may be managed by a cable provider, whereas server 104 and user devices 106A-C are managed by a third-party entity. As such, the third-party entity and/or cable provider may correct any issues in the cable provider's broadcasting network 102.

As will be discussed in more detail below with respect to FIGS. 2 and 3, broadcasting network 102 includes headend 108 and STBs 110A-D. STBs 110A-D may be located at various geographical locations 112A and 112B in broadcasting network 102. Geographical locations 112A and 112B may any place of business or home that has one or STBs 110A-D. Accordingly, in some embodiments, a particular geographical location 112A or 112B may have one STBs 110A-D or multiple STBs 110A-D.

Headend 108 provides programming content to STBs 110A-D. The programming content may be digital and includes multiple channels (e.g., channels 2, 4, and 7) for processing by STBs 110A-D (e.g., for recording and or viewing by a user), such as those permitted by the entity managing the server 104 and/or headend 108 (e.g., cable provider). Accordingly, to ensure that STBs 110A-D are able to process the channels adequately, server 104 and/or headend 108 provides requests for STBs 110A-D to process diagnostic tests, which will be described in more detail below.

Along these lines, the requests for diagnostic tests may be sent to STBs 110A-D on predetermined intervals (e.g., daily or hourly). The requests may also be sent to specific STBs 110A-D. For example, in some embodiments, cable providers may receive complaints from STB 110A-D users of not being able to tune to specific channels (e.g., watch or record programming content). Thus, requests for diagnostic tests may be sent to STBs 110A-D of the users providing the complaint. The requests for diagnostic tests may also be sent to STBs 110A-D on the same tap or fiber node as the STBs 110A-D of the user providing the complaint. In some embodiments, the requests for diagnostic tests may be sent to all STBs in the broadcasting network 102 at the same or different times.

Figure 2:
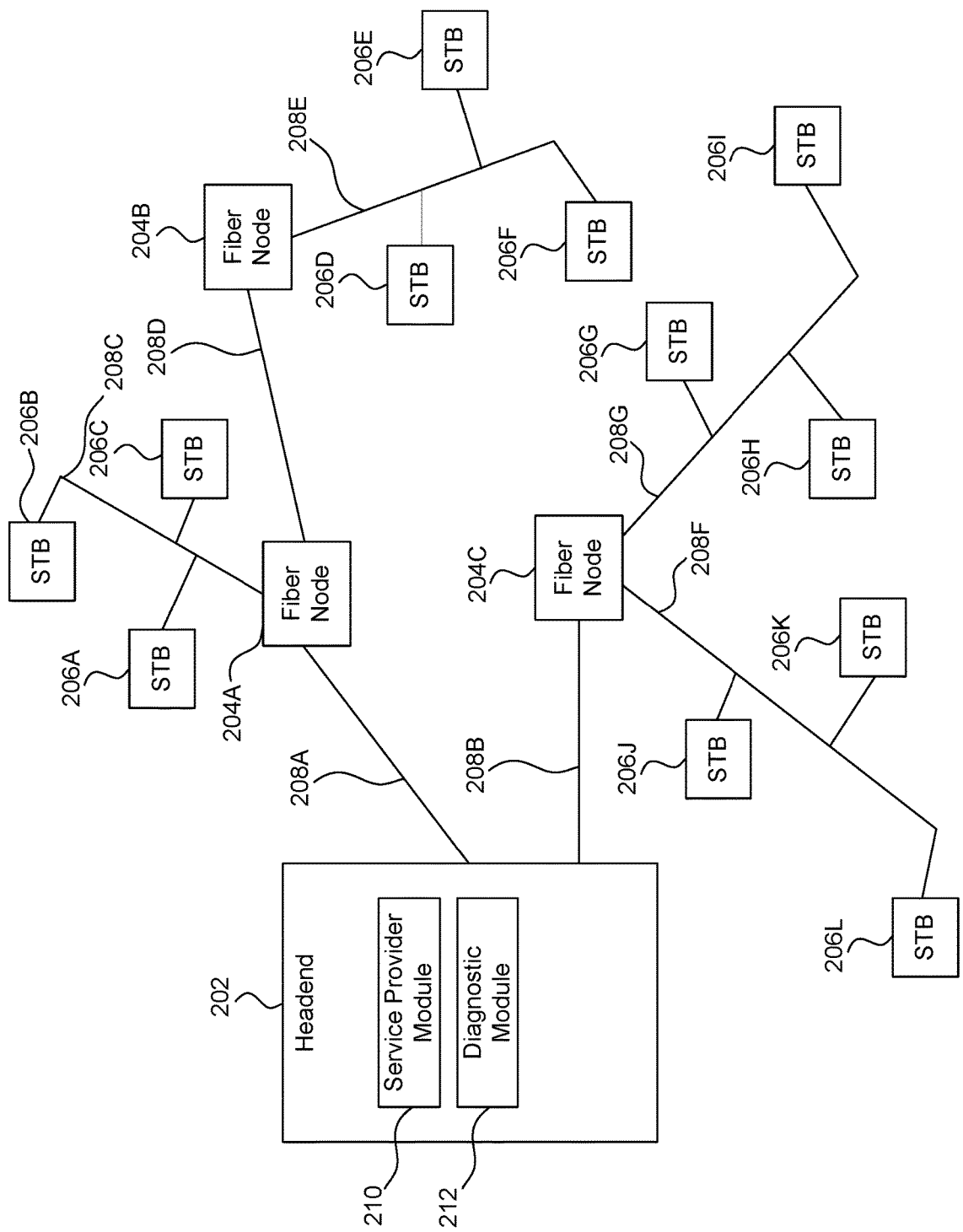
FIG. 2 is a block diagram of an example broadcasting network, according to some embodiments.
Figure 3:
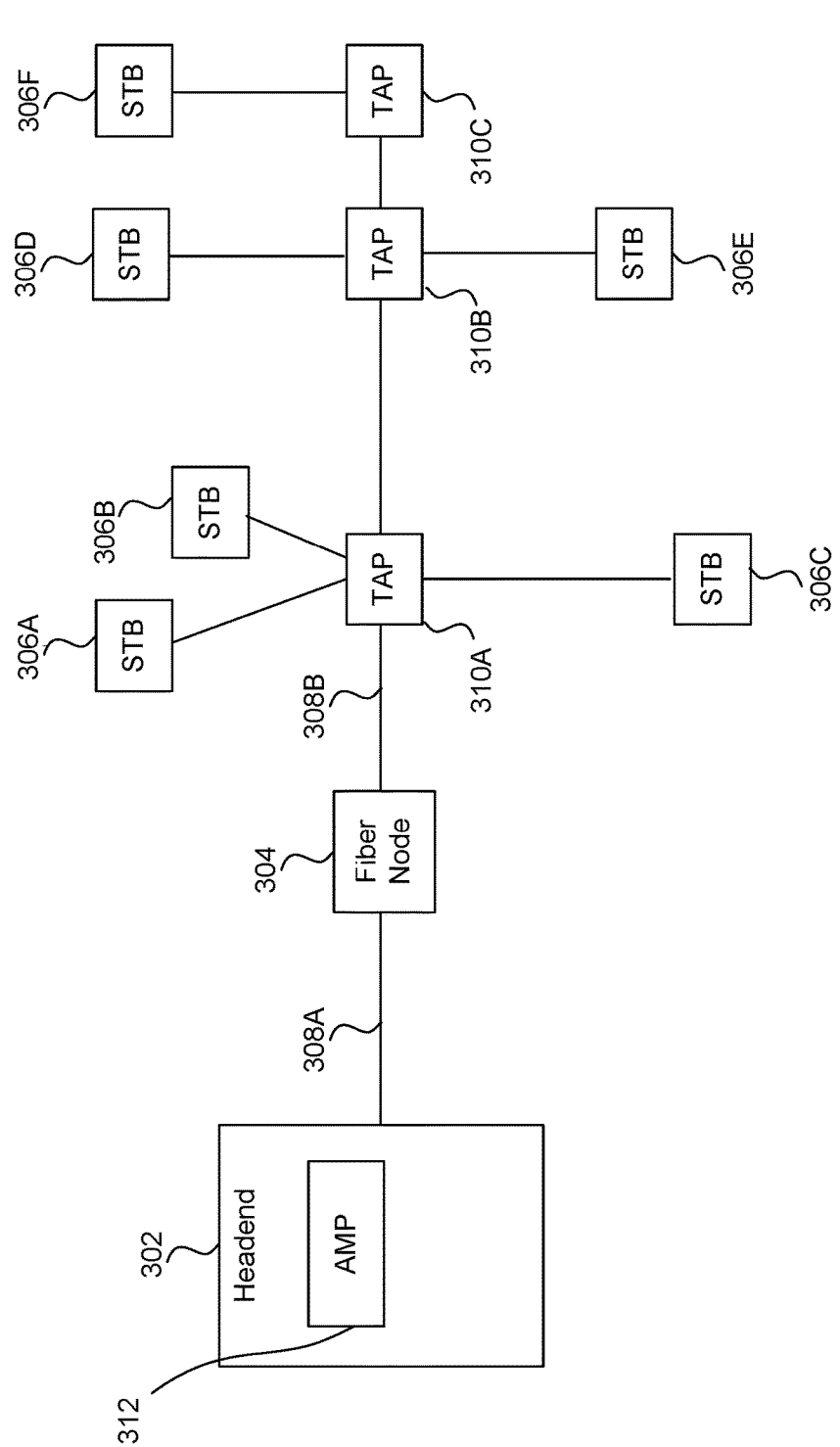
FIG. 3 is a block diagram of a portion of an example broadcasting network, according to some embodiments.

FIGS. 2 and 3 illustrate block diagrams of example broadcasting networks 200 and 300 for providing programming data and/or diagnostic tests to STBs 206A-L and 306A-F. As described above, in some embodiments, broadcasting networks 200 and 300 may be managed by a cable provider. Further, broadcasting networks 200 and 300 include headend 202 and 302, fiber nodes 204A, 204B, and 304, STBs 206A-L and 306A-F, and coaxial cables or fiber cables 208A, 208B, and 308A, coaxial cables 208C-G and 308B. Headend 202 and 302 provides cable television to STBs 206A-L and 306A-F at geographical locations 112A and 112B (of FIG. 1) and performs diagnostic tests on STBs 206A-L and 306A-F via coaxial cables 208A-G.

Referring to FIG. 2, fiber nodes 204A and 204B may receive programming data and/or diagnostic tests directly from headend 202. Alternatively, fiber node 204C may receive programming data and/or diagnostic tests indirectly from the headend 202, for example, by another fiber node 204A. Referring to FIG. 3, broadcasting network 300 further includes one or more taps 310A-C and amplifier 312. Taps 310A-C are passive and relay programming data and/or diagnostic tests to one or more STBs 306A-F from headend 302 via coaxial cable 308B. Accordingly, as illustrated, taps 310A-C may support multiple STBs 306A-F, which may be different distances away from the taps 310A-C and may belong to the same or different geographical locations 112A and 112B (of FIG. 1). Thus, coaxial cable 308A-B may have one or more taps 310A-C that relay programming data and/or diagnostic tests to one or more geographical locations 112A-B having one or more STBs 110A-D (of FIG. 1).

Further, amplifier 312 amplifies signals provided by headend 302 and/or fiber node 304. In some embodiments, as illustrated, amplifier 312 may be part of headend 302. In some embodiments, although not illustrated, amplifier 312 may be part of coaxial cable 308A and 308B connected to fiber node 304. A person skilled in the art would readily realize that any number of amplifiers 312 may be provided in broadcasting network 300 fiber node.

Figure 4:
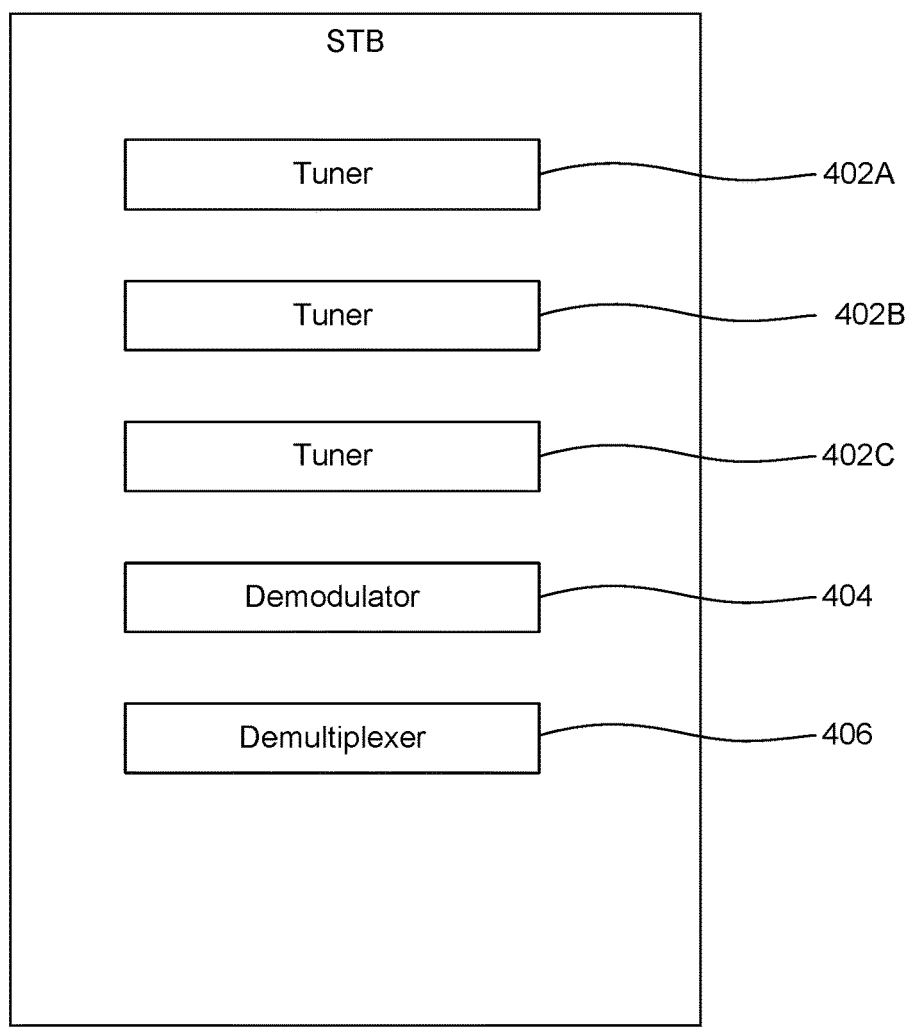
FIG. 4 is a block diagram of a method of notifying users of issues in a broadcasting system, according to some embodiments.

FIG. 4 is a block diagram of an example STB 400. STB 400 is a two-way communication device. As such, STB 400 receives programming data and diagnostic tests from headend 102 and 202 (of FIG. 1), as well as sends the diagnostic results of the diagnostic tests back to headend 102 and 202.

STB 400 includes tuners 402A-C, demodulator 404, demultiplexer 406, and storage 408. Tuners 402A-C tune to various channels at different times. Accordingly, upon receiving programming data, tuners 402A-C tune to particular channels, such as those requested by a user. The channels are then demodulated by demodulator 404. Thereafter, the channels are demultiplexed by demultiplexer 406 to separate the relevant packets of the channels. STB 400 may then process the packets, for example, by sending them to a display device (not illustrated) or saving them in a storage (not illustrated).

Further, upon receiving programming diagnostic tests, STB 400 determines channels specified in the diagnostic tests. STB 400 then identifies tuners that are available to tune (i.e., idle tuners) to those specified channels. An idle tuner may be a tuner that is not currently being utilized, or that may be utilized for another purpose without affecting other processes being performed. As such, STB 400's tuners may process different channels concurrently and thus, for example, permit switching between channels without lag and/or recording different channels than that being viewed.

Accordingly, an idle tuner may be a tuner that is being utilized for these processes so long as that process can be sufficiently performed by the STB 400 currently or in the future.

As such, STB 400's tuners 402A-C may simultaneously tune to multiple channels. By operating in such a fashion, users may switch between different channels without waiting. In addition, STB 400 may perform a diagnostic test of a particular channel using tuner 402A, while also turning to the same or different channels using tuners 402B and 402C. Although STB 400 utilizes three tuners 402A-C, persons skilled in the art would understand that STB 400 may have any number of tuners (e.g., 2, 4, 6, or 10).

However, in some circumstances, STB 400's idle tuners may become utilized during the diagnostic tests, for example, such that all STB 400's tuners 402A-C are being utilized. Accordingly, STB 400 may stop the diagnostic tests while the tuner 402A is being utilized and continue or restart the diagnostic tests upon a tuner becoming idle. Along these lines, STB 400 may utilize the first tuner 402A-C that becomes available. Alternatively, STB 400 may instead utilize the same tuner 402A to perform the diagnostic tests, thus allowing determination of whether the tuner 402A potentially has an issue.

Referring to FIG. 2, for providing programming content and diagnostic tests, headend 202 includes service provider module 210 and diagnostic module 212. Service provider module 210 provides programming data to STBs 206A-L. As stated above, the programming data includes channels and can be digital. Diagnostic module 212 provides various diagnostic tests to STBs 206A-L to ensure that STBs 206A-L are able to adequately and sufficiently process channels provided in the programming data.

The diagnostic tests include instructions for STBs to have idle tuners tune to channels so that STBs 206A-L can determine performance characteristics of STBs 206A-L in processing the specified channels. Accordingly, the instructions may reference specific channels. Alternatively, the instructions may have STBs 206A-C perform the diagnostic tests for each channel provided by the programming data. In some embodiments, the instructions may inform STBs 206A-L to have multiple tuners 302A-C (of FIG. 3) tune to same or different channels in parallel and, also, concurrently determine the performance characteristics for each channel in parallel, when possible. The instructions may also inform STBs 206 a period of time for tuners 302A-C to tune to the channels.

Further, the instructions also specify the type of performance characteristics of the channel. As such, the instructions can include a specific performance characteristic or a group of performance characteristics. The performance characteristics can relate to STBs 206A-L themselves or other components within the broadcasting network 200 (e.g., headend 202, fiber nodes 204A-C, and/or fiber cables or coaxial cables 208A-G of FIG. 2, as well as taps 310A-C or amplifier 312 of FIG. 3).

For example, referring to FIG. 3, the performance characteristics may relate to signal issues caused by or related to a particular STB 306A-F. For example, a geographical location having a particular STB 306A-F may have faulty wiring or components (e.g., a splitter and/or an amplifier). Along these lines, the performance characteristics may relate to a component failure of a STB 206A-L. For example, a CPU and/or a memory of STBs 206A-L may be overwhelmed or overutilized, thereby causing signal issues. Further, the performance characteristics may also relate to signal issues caused by a service drop resulting from, for example, the connection between headend 302 and a particular fiber node 304, the connection between a particular tap 310A-C and a particular STB 306A-F, and/or the connection between a particular fiber node 304 and a particular tap 310A-C. In turn, the performance characteristics may relate to signal quality, signal strength, and/or signal noise ratio, to provide a few examples. Thus, the performance characteristics may be timing, frequency, level, message contents, and/or their combination.

Referring to FIG. 1, after receiving the performance characteristics from STBs 206A-L (of FIG. 2), server 104 performs an analysis of the performance characteristics. In some embodiments, in performing the analysis on a particular channel, server 104 may compare the performance characteristics of a particular STBs 110A-D processing the channel to the specification standard (e.g., establishing minimum standards) of the channel and/or to the performance characteristics of other STBs 110A-D processing the channel. As will be discussed in more detail below, server 102 can then determine if the particular STB 110A-D's performance characteristic is outside of specified limits provided in the specification standard and/or exceeds another STB 110A-D's performance characteristic by a predetermined amount. Server 104 may also include headend 104 notifying and forwarding the information to server 104.

Based on the analysis, server 104 may determine if there is an issue in broadcasting network 200 and 300 (of FIGS. 2 and 3) affecting the processing of the channels. For example, if the particular STB's performance characteristic exceeds the specified limit provided in the specifications or the predetermined amount of another STB 110A-D's performance characteristic, server 104 detects the presence of an issue in the broadcasting networks 200 and 300. As discussed above, the issue may relate to a component of the broadcasting network 200 and 300 (e.g., headend 302, filed node 304, STBs 306A-F, fiber cable or coaxial cables 308A and 308B, taps 310A-C, and amplifier 312 of FIG. 3). After detecting the presence of the issue, server 104 identifies a relative or precise geographical location of the issue in the broadcasting network 200 and 300 (of FIGS. 2 and 3).

To do so, in some embodiments, server 104 has a map of broadcasting network 200 and 300 (of FIGS. 2 and 3). In some embodiments, the map may be a topographical map. As such, the topology may include the geographical location of all components, as well as the distance and/or interconnectivity between them, in broadcasting networks 200 and 300. Accordingly, the server 104 may determine a precise geographical location of the component in broadcasting network 200 and 300 causing the issue. As such, server 104 may determine that the issue relates to headend 202 and 302, fiber nodes 204A, 204B, and 304, STBs 206A-L and 306A-F, coaxial cables or fiber cables 208A, 208B, and 308A, and/or coaxial cables 208C-G and 308B.

However, the map of broadcasting networks 200 and 300 (of FIGS. 2 and 3) topology may include the geographical location of some components and/or the interconnectivity of them in broadcasting networks 200 and 300. As a result, server 104 may be unaware of the geographical location and/or connectivity of some components in broadcasting networks 200 and 300. For example, referring to FIGS. 2 and 3, server 104 (of FIG. 1) may know the geographical location of taps 310A-C and their interconnection with STBs 306A-F (e.g., tap 310A is connected to 306A-C). As such, if server 104 determines that STBs 306D-G have an issue and that STBs 306A-C do not have an issue, server 104 determines that the issue is between taps 310A and 310C. By operating in such a fashion, only components between taps 310A and 310C need to be inspected.

As another example, referring to FIGS. 2 and 3, server 104 (of FIG. 1) may know the geographical location of headend 302 and/or fiber nodes and may also know the interconnectivity between headend 302 and fiber nodes 204A-C and 304. However, server 104 may not be aware of the geographical location of taps 310A-C in broadcasting network 300. Accordingly, upon detection of the presence of an issue relating to a particular STB 306A-C, to identify possible issues relating to taps 310A-C and amplifiers 312, server 104 specifies a search area of any shape (e.g., circle) and distance from the particular STB 306A-C. Server 104 then excludes taps 310A-C and amplifiers 312 outside of the search area, regardless of whether taps 310A-C and amplifiers 312 are associated with the same or different fiber node 304 as the particular STB 306A-C. Server 104 also excludes taps 310A-C and amplifiers 312 inside of the search area connected to a different fiber node 304. By operating in such a fashion, only taps 310A-C and amplifiers within the search area and associated with the same fiber node 304 as the STB 306A-C having the issue need to be inspected.

Further, in some embodiments, to determine a relative geographical location of the issue in the broadcasting network 200 and 300, server 104 (of FIG. 1) may have headend 202 and 302 send synchronization messages to STBs 206A-L and 306A-F including the STBs 206A-L and 306A-F having issues. The synchronization message may be sent at the same or different times. After a period of time, server 104 gets a response from STBs 206A-L and 306A-F. Server 104 then determines a response time from STBs 206A-L and 306A-F. Based on the response time, server 104 determines a search area of any shape (e.g., circle) and distance extending from headend 202 and 302. As such, STBs 206A-L and 306A-F having response times longer than the longest time of the STBs 206A-L and 306A-F having the issue may be outside the search area. In contrast, STBs 206A-L and 306A-F having response times shorter than the longest time of the STBs 206A-L and 306A-F may be inside of the search area. By operating in such a fashion, only components within the search area need to be inspected.

Referring to FIG. 1, after identifying the precise or relative geographical location of the issue in the broadcasting network 200 and 300 (of FIGS. 2 and 3), server 104 may update an existing map, or create a new map, of broadcasting network 200 and 300. The map includes a known or relative geographical location of all known components and interconnection between them. The map also includes a known or relative geographical location of the issue. As such, in some embodiments, the map includes contrasting colors indicating possible geographical locations for the issue.

In turn, server 104 forwards the information relating to the issue (e.g., a map illustrating the issue) to user devices 106A-C to permit correctives to be taken. In some embodiments, different users may be in charge of troubleshooting different geographical areas. As such, based on a particular geographical location of the issue, the information relating to the issue can be sent to the appropriate user device 106A-C. The users of user devices 106A-C may then be notified of the issue. In some embodiments, the users may be service technicians assigned to the geographical location. In some embodiments, the users may be operators who send a service technician to a particular geographical location (e.g., the precise or relative geographical location) to determine the issue and/or remedy the issue. As described above, this may be done in real-time, for example, while programming data and additional diagnostic tests are being provided to STBs. As such, STBs may be provided with continued and uninterrupted service.

Figure 5:
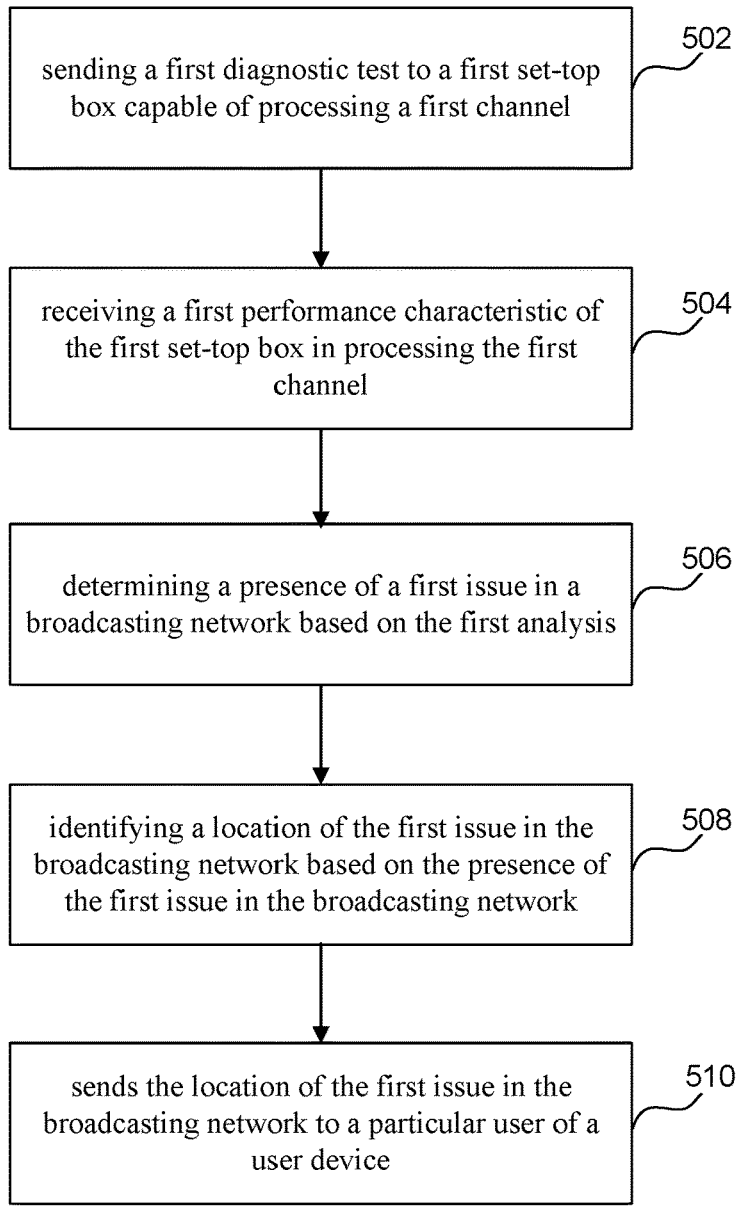
FIG. 5 is a block diagram of an example method for identifying a geographical location of an issue in a broadcasting network, according to some embodiments.

FIG. 5 is a flowchart for an example method 500 for identifying a geographical location of an issue in a broadcasting network. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously or in a different order than shown in FIG. 5, as will be understood by a person of ordinary skill in the art. Method 500 shall be described with reference to the example embodiments of FIGS. 1-4. However, method 500 is not limited to that those example embodiments.

At 502, server 104 or headend 108, 202, and 302 sends a first diagnostic test to STB 400 capable of processing a first channel. Headend 108, 202, and 302 and STB 400 are part of a broadcasting network 200 and 300. The first diagnostic tests include instructions to determine the performance characteristics of the first channel. The performance characteristics may relate to signal quality, signal strength, and/or signal noise ratio, to provide a few examples. STB 400 includes tuners 402A-C and is able to tune to different channels at the same time. As such, STB 400's tuner 402A may process the first channel and determine the performance characteristics related to the first channel, while STB 400's tuner 402B is processing a first or second channel for the user.

At 504, server 104 or headend 108, 202, and 302 receives, from the first STB, the first performance characteristic of the STB in processing the first channel.

At 506, server 104 or headend 108, 202, and 302 determines a presence of a first issue in the broadcasting network based on the performance characteristics. For example, server 104 or headend 108 then determines if the first performance characteristic meets or exceeds a threshold, for example, by comparing it to a specification for that channel, which may be provided by a channel provider. The issue relates to a component of broadcasting network 200 and 300. The component may be headend 202 and 302, fiber nodes 204A, 204B, and 304, STBs 206A-L and 306A-F, and coaxial cables or fiber cables 208A, 208B, and 308A, or coaxial cables 208C-G and 308B.

At 508, server 104 or headend 108, 202, and 302 identifies the geographical location of the first issue in the broadcasting network based on the determining of the presence of the first issue in the broadcasting network. In some embodiments, where server 104 or headend 108 knows the exact topology of broadcasting network 200 and 300, server 104 or headend determines the source and exact geographical location of the issue. In some embodiments, where server 104 or headend 108, 202, and 302 knows the presence and/or interconnections of some components of broadcasting network 200 and 300, server 104 or headend 108, 202, and 302 determines a relative geographical location of the issue.

At 510, server 104 or headend 108 sends the geographical location of the first issue in the first broadcasting network to a user device 106A. As such, a user may be notified of the first issue and the geographical location of the first issue in the broadcasting network. In some embodiments, the user may be a service technician assigned to that area. In some embodiments, the user may be an operator who informs a service technician of the issue.

Figure 6:
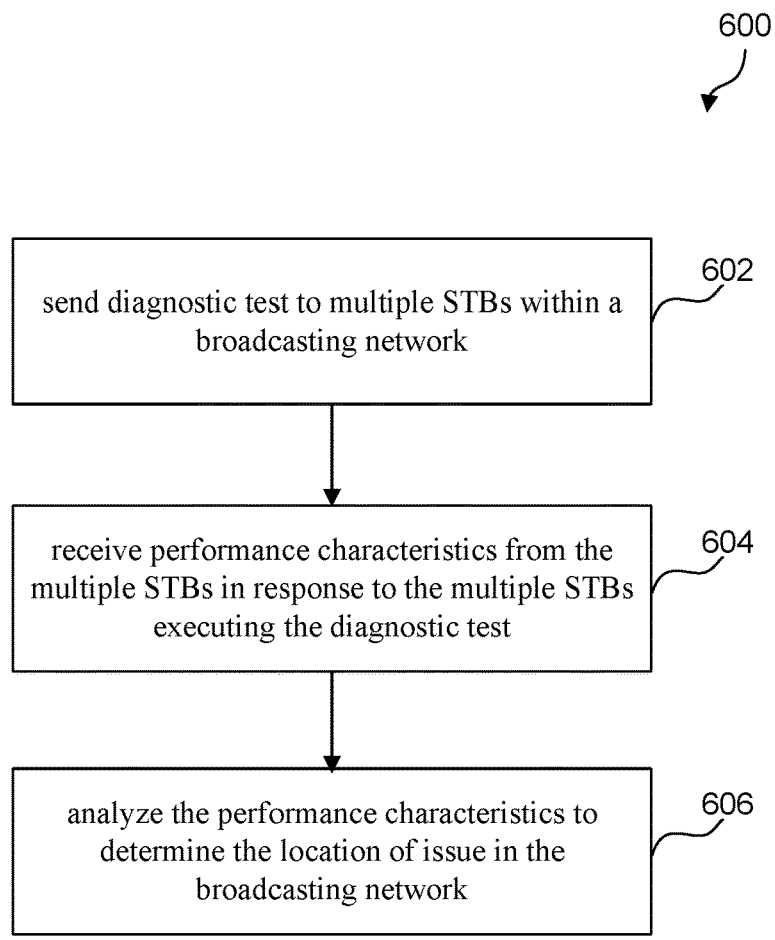
FIG. 6 is a block diagram of another example method for identifying a geographical location of an issue in a broadcasting network, according to some embodiments.

FIG. 6 is a flowchart for another example method 600 for identifying a geographical location of an issue in a broadcasting network. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously or in a different order than shown in FIG. 6, as will be understood by a person of ordinary skill in the art. Method 600 shall be described with reference to the example embodiments of FIGS. 1-4. However, method 600 is not limited to that those example embodiments.

At 602, server 104 or headend 108, 202, and 302 sends a diagnostic test to multiple STBs, such as one or more of STBs 110A-D as described above in FIG. 1, one or more of STBs 206A-L as described above in FIG. 2, one or more of STBs 306A-F as described above in FIG. 3, and/or any combination thereof, within a broadcasting network, such as broadcasting network 102 as described above in FIG. 1, broadcasting network 200 as described above in FIG. 2, and/or broadcasting network 300 as described above in FIG. 3. In some situations, the server 104 or headend 108, 202, and 302 can send the diagnostic test in response to receiving one or more complaints of issues with one or more of the multiple STBs. Each of these multiple STBs can include multiple tuners, such as tuners 402A-C as described above in FIG. 4. The diagnostic test can instruct one or more of these multiple tuners to tune to a specific channel identified in the diagnostic test and therefore determine one or more performance characteristics of the specific channel. The performance characteristics may relate to signal quality, signal strength, and/or signal noise ratio of the specific channel to provide a few examples. In some situations, the multiple tuners can be independently operated allowing one or more of these multiple tuners to tune to the specific channel identified in the diagnostic test while other tuners from among the multiple tuners to tune to other channels such as channels having programming content. This can allow the diagnostic test to be performed transparently without interruptions in service.

At 604, server 104 or headend 108, 202, and 302 receives, from the multiple STBs, performance characteristics from the multiple STBs in processing the specific channel identified in the diagnostic test.

At 606, server 104 or headend 108, 202, and 302 analyzes the performance characteristics to determine the geographical location of the issue in the broadcasting network. Generally, the server 104 or headend 108, 202, and 302 compares the performance characteristics to another and, based upon, this comparison, identifies the geographical location of the issue in the broadcasting network. For example, if a first STB within a geographical location, such as geographical location 112A or 112B to provide some examples, has worst performance measurements than a second STB within the same geographical location, then the server 104 or headend 108, 202, and 302 can determine that the issue in the broadcasting network is associated with the first STB. As another example, if one or more STBs within a first geographical location, such as geographical location 112A or 112B to provide some examples, have worst performance measurements than one or more STBs within a different, second geographical location, then the server 104 or headend 108, 202, and 302 can determine that the issue in the broadcasting network is associated with the first geographical location, for example, one or more shared components servicing the first geographical location, such as a connection between a tap and the geographical location to provide an example, are causing the issue in the broadcasting network. As a further example, if one or more STBs within a first geographical location and a second geographical location have worst performance measurements than one or more STBs within a third geographical location, then the server 104 or headend 108, 202, and 302 can determine that one or more shared components servicing the first geographical location and the second geographical location, such as a tap to provide an example, are causing the issue in the broadcasting network. In some embodiments, server 104 or headend 108, 202, and 302 can dispatch a service technician to the geographical location of the issue in the broadcasting network once it has been determined.

Figure 7:
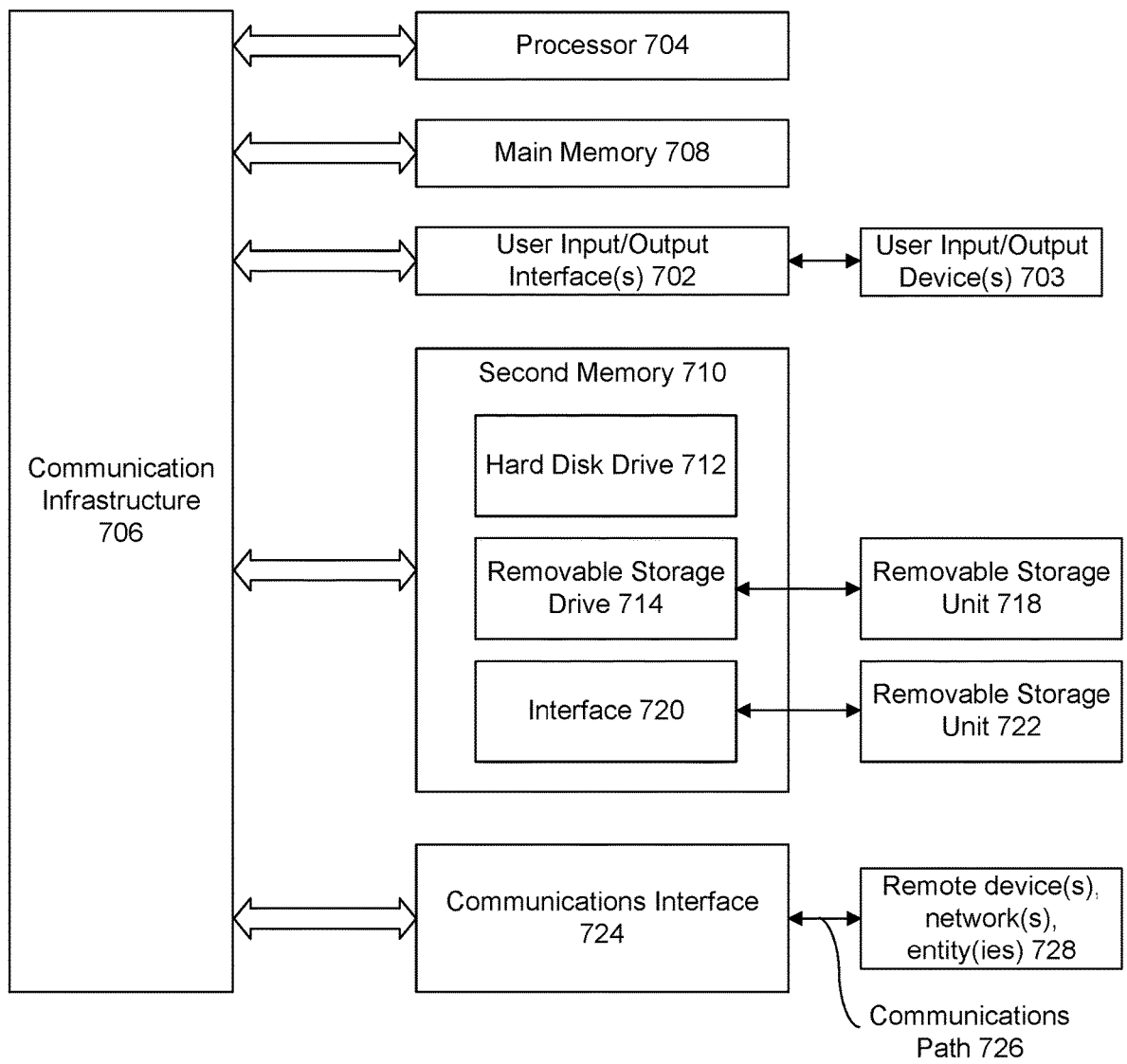
FIG. 7 is an example computer system useful for implementing various embodiments.

Various embodiments may be implemented, for example, using one or more well-known computer systems, such as computer system 700, shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer-usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities, or other approaches for allowing computer programs and/or other instructions and/or data to be accessed by computer system 700. Such means, devices, components, instrumentalities, or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents.

What is claimed is:

1. A computer-implemented method for identifying an issue in a broadcasting network, the computer-implemented method comprising:

sending a diagnostic test to a plurality of set-top boxes of the broadcasting network, the diagnostic test configuring the plurality of set-top boxes to determine a plurality of performance characteristics of a channel from among a plurality of channels;

receiving, from the plurality of set-top boxes, the plurality of performance characteristics;

identifying at least one component of the broadcasting network that is causing the issue based upon a comparison of the plurality of performance characteristics with one another;

retrieving a map of the broadcasting network, the map of the broadcasting network not including a precise geographical location of the at least one component; and specifying a search area on the map of the broadcasting network in relation to at least one set-top box from among the plurality of set-top boxes that is experiencing the issue to identify a relative geographical location of the at least one component.

2. The computer-implemented method of claim 1, wherein a first set-top box from among the plurality of set-top boxes and a second set-top box from among the plurality of set-top boxes are situated within a same physical structure, and wherein the identifying comprises:
comparing a first performance characteristic from among the plurality of performance characteristics corresponding to the first set-top box and a second performance characteristic from among the plurality of performance characteristics corresponding to the second set-top box; and identifying the at least one component to be associated with the first set-top box when the plurality of performance characteristics indicates that the first set-top box is performing worse than the second set-top box.

3. The computer-implemented method of claim 1, wherein a first set-top box from among the plurality of set-top boxes is situated within a first physical structure, wherein a second set-top box from among the plurality of set-top boxes is situated within a second physical structure, and wherein the identifying comprises:
comparing a first performance characteristic from among the plurality of performance characteristics corresponding to the first set-top box and a second performance characteristic from among the plurality of performance characteristics corresponding to the second set-top box; and identifying the at least one component to be associated with the first physical structure when the plurality of performance characteristics indicates that the first set-top box is performing worse than the second set-top box.

4. The computer-implemented method of claim 3, wherein the identifying the at least one component to be associated with the first physical structure comprises:
identifying the at least one component to be a connection between a tap servicing the first physical structure and the first physical structure when the plurality of performance characteristics indicates that the first set-top box is performing worse than the second set-top box.

5. The computer-implemented method of claim 1, wherein a first set-top box from among the plurality of set-top boxes is situated within a first physical structure, wherein a second set-top box from among the plurality of set-top boxes is situated within a second physical structure, wherein a third set-top box from among the plurality of set-top boxes is situated within a third physical structure, and wherein the identifying comprises:
comparing a first performance characteristic from among the plurality of performance characteristics corresponding to the first set-top box, a second performance characteristic from among the plurality of performance characteristics corresponding to the second set-top box, and a third performance characteristic from among the plurality of performance characteristics corresponding to the third set-top box; and identifying the at least one component to be associated with the first physical structure when the plurality of performance characteristics indicates that the first set-top box is performing worse than the second set-top box and the third set-top box.

6. The computer-implemented method of claim 5, wherein the identifying the geographical location of the issue to be associated with the first physical structure comprises:
identifying the at least one component to be a tap servicing the first physical structure when the plurality of performance characteristics indicates that the first set-top box is performing worse than the second set-top box and the third set-top box.

7. The computer-implemented method of claim 1, further comprising:
sending the map of the broadcasting network having the search area to a user device that is associated with a service technician of the broadcasting network to allow the service technician to locate at least one component.

8. A headend for identifying an issue in a broadcasting network, the headend comprising:
a communications interface configured to:
send a diagnostic test to a plurality of set-top boxes of the broadcasting network, the diagnostic test configuring the plurality of set-top boxes to determine a plurality of performance characteristics of a channel from among a plurality of channels, and receive, from the plurality of set-top boxes, the plurality of performance characteristics; and a processor configured to:
identify the at least one component of the broadcasting network that is causing the issue based upon a comparison of the plurality of performance characteristics with one another, retrieve a map of the broadcasting network, the map of the broadcasting network not including a precise geographical location of the at least one component, and specify a search area on the map of the broadcasting network in relation to at least one set-top box from among the plurality of set-top boxes that is experiencing the issue to identify a relative geographical location of the at least one component.

9. The headend of claim 8, wherein a first set-top box from among the plurality of set-top boxes and a second set-top box from among the plurality of set-top boxes are situated within a same physical structure, and wherein the processor is configured to:
compare a first performance characteristic from among the plurality of performance characteristics corresponding to the first set-top box and a second performance characteristic from among the plurality of performance characteristics corresponding to the second set-top box; and identify the at least one component to be associated with the first set-top box when the plurality of performance characteristics indicates that the first set-top box is performing worse than the second set-top box.

10. The headend of claim 8, wherein a first set-top box from among the plurality of set-top boxes is situated within a first physical structure,
 wherein a second set-top box from among the plurality of set-top boxes is situated within a second physical structure, and
 wherein the processor is configured to:
  compare a first performance characteristic from among the plurality of performance characteristics corresponding to the first set-top box and a second performance characteristic from among the plurality of performance characteristics corresponding to the second set-top box; and
  identify the at least one component to be associated with the first physical structure when the plurality of performance characteristics indicates that the first set-top box is performing worse than the second set-top box.

11. The headend of claim 10, wherein the processor is configured to:
 identify the at least one component to be a connection between a tap servicing the first physical structure and the first physical structure when the plurality of performance characteristics indicates that the first set-top box is performing worse than the second set-top box.

12. The headend of claim 8, wherein a first set-top box from among the plurality of set-top boxes is situated within a first physical structure,
 wherein a second set-top box from among the plurality of set-top boxes is situated within a second physical structure,
 wherein a third set-top box from among the plurality of set-top boxes is situated within a third physical structure, and
 wherein the processor is configured to:
  compare a first performance characteristic from among the plurality of performance characteristics corresponding to the first set-top box, a second performance characteristic from among the plurality of performance characteristics corresponding to the second set-top box, and a third performance characteristic from among the plurality of performance characteristics corresponding to the third set-top box; and
  identify the at least one component to be associated with the first physical structure when the plurality of performance characteristics indicates that the first set-top box is performing worse than the second set-top box and the third set-top box.

13. The headend of claim 12, wherein the processor is configured to:
 identify the at least one component to be a tap servicing the first physical structure when the plurality of performance characteristics indicates that the first set-top box is performing worse than the second set-top box and the third set-top box.

14. The headend of claim 8, wherein the processor is configured to send the map of the broadcasting network having the search area to a user device that is associated with a service technician of the broadcasting network to allow the service technician to locate at least one component.

15. A headend for identifying an issue in a broadcasting network, the headend comprising:
 a memory that stores a diagnostic test, the diagnostic test configuring a plurality of set-top boxes to determine a plurality of performance characteristics of a channel from among a plurality of channels; and
 a processor configured to:
  receive, from the plurality of set-top boxes in response to sending the diagnostic test to the plurality of set-top boxes, the plurality of performance characteristics,
  identify the at least one component of the broadcasting network that is causing the issue based upon a comparison of the plurality of performance characteristics with one another,
  retrieve a map of the broadcasting network, the map of the broadcasting network not including a precise geographical location of the at least one component, and
  specify a search area on the map of the broadcasting network in relation to at least one set-top box from among the plurality of set-top boxes that is experiencing the issue to identify a relative geographical location of the at least one component.

16. The headend of claim 8, wherein the at least one component is from among a plurality of components of the broadcasting network, and
 wherein the processor is further configured to exclude those components from among the plurality of components of the broadcasting network that are greater than a distance from the at least one set-top box from the search area.

17. The headend of claim 16, wherein the plurality of components of the broadcasting network are coupled to the headend via a fiber node from among a plurality of fiber nodes, and
 wherein the processor is further configured to exclude those components from among the plurality of components of the broadcasting network that are coupled to the headend via other fiber nodes from among the plurality of fiber nodes.

18. The headend of claim 15, wherein a first set-top box from among the plurality of set-top boxes and a second set-top box from among the plurality of set-top boxes are situated within a same physical structure, and
 wherein the processor is configured to:
  compare a first performance characteristic from among the plurality of performance characteristics corresponding to the first set-top box and a second performance characteristic from among the plurality of performance characteristics corresponding to the second set-top box; and
  identify the at least one component to be associated with the first set-top box when the plurality of performance characteristics indicates that the first set-top box is performing worse than the second set-top box.

19. The headend of claim 15, wherein a first set-top box from among the plurality of set-top boxes is situated within a first physical structure,
 wherein a second set-top box from among the plurality of set-top boxes is situated within a second physical structure, and
 wherein the processor is configured to:
  compare a first performance characteristic from among the plurality of performance characteristics corresponding to the first set-top box and a second performance characteristic from among the plurality of performance characteristics corresponding to the second set-top box; and
  identify the at least one component to be associated with the first physical structure when the plurality of performance characteristics indicates that the first set-top box is performing worse than the second set-top box.

20. The headend of claim 19, wherein the processor is configured to:
identify the at least one component to be a connection between a tap servicing the first physical structure and the first physical structure when the plurality of performance characteristics indicates that the first set-top box is performing worse than the second set-top box.

21. The headend of claim 15, wherein a first set-top box from among the plurality of set-top boxes is situated within a first physical structure,
wherein a second set-top box from among the plurality of set-top boxes is situated within a second physical structure,
wherein a third set-top box from among the plurality of set-top boxes is situated within a third physical structure, and
wherein the processor is configured to:
compare a first performance characteristic from among the plurality of performance characteristics corresponding to the first set-top box, a second performance characteristic from among the plurality of performance characteristics corresponding to the second set-top box, and a third performance characteristic from among the plurality of performance characteristics corresponding to the third set-top box; and
identify the at least one component to be associated with the first physical structure when the plurality of performance characteristics indicates that the first set-top box is performing worse than the second set-top box and the third set-top box.

22. The headend of claim 21, wherein the processor is configured to:
identify the at least one component to be a tap servicing the first physical structure when the plurality of performance characteristics indicates that the first set-top box is performing worse than the second set-top box and the third set-top box.

23. The headend of claim 15, wherein the processor is further configured to:
send the map of the broadcasting network having the search area to a user device that is associated with a service technician of the broadcasting network to allow the service technician to locate at least one component.

* * * * *